United States Patent [19]

Mail

[11] Patent Number: 4,714,298
[45] Date of Patent: Dec. 22, 1987

[54] AIRCRAFT WHEEL BRAKE METERING AND DESPIN VALVE

[75] Inventor: Jacob A. Mail, Hertzia, Israel

[73] Assignee: The Boeing Company, Seattle, Wash.

[21] Appl. No.: 681,300

[22] Filed: Dec. 13, 1984

[51] Int. Cl.$^4$ .............................................. B64C 25/10
[52] U.S. Cl. .................... 303/100; 303/118; 244/111; 244/102 R
[58] Field of Search ............... 303/100, 101, 103, 118, 303/52; 244/111, 102 R, 102 SL

[56] References Cited

U.S. PATENT DOCUMENTS

| | | | |
|---|---|---|---|
| 2,616,641 | 11/1952 | Gagen | 244/111 |
| 2,759,570 | 8/1956 | Shirey | 188/181 |
| 2,926,873 | 3/1960 | Dewar | 244/111 |
| 3,284,142 | 11/1966 | Bueler | 303/13 |
| 3,503,655 | 3/1970 | Heimler | 303/21 |
| 3,504,947 | 4/1970 | Valentine | 303/13 |
| 3,533,661 | 10/1970 | Cruse | 303/68 |
| 3,617,097 | 11/1971 | Grabb et al. | 303/13 |
| 3,712,685 | 1/1973 | Hoffman et al. | 303/52 |
| 3,746,401 | 7/1973 | Stearns | 303/71 |
| 3,778,119 | 12/1973 | Kersting | 303/68 |
| 4,120,540 | 10/1978 | Devlieg | 244/111 |
| 4,251,115 | 2/1981 | Knox et al. | 303/118 X |
| 4,360,239 | 11/1982 | Boehringer | 244/111 X |

*Primary Examiner*—Duane A. Reger
*Assistant Examiner*—Matthew C. Graham
*Attorney, Agent, or Firm*—Delbert J. Barnard

[57] ABSTRACT

A port control member (80) is depressed by either a mechanical force (124) applied on it by the pilot (44), for moving it to meter pressure and flow from a supply pressure (72) to the wheel brakes (34), or a hydraulic pressure force (128) applied following take-off, to activate the brakes (34) for stopping the wheels from spinning. The valve housing (62) defines an annular command pressure chamber (102) surrounding a portion of the port control member (80). The port control member (80) provides a larger pressure surface (128) to this chamber in the brake applying direction than it does in the opposite direction. This area differential results in pressure within the command pressure chamber (102) acting to move the port control member (80) in a brake applying direction. The command pressure chamber (102) may be connected to the wheel retract system (130) so that pressure is delivered into this chamber (102) automatically at the start of the wheel retraction operation.

14 Claims, 7 Drawing Figures

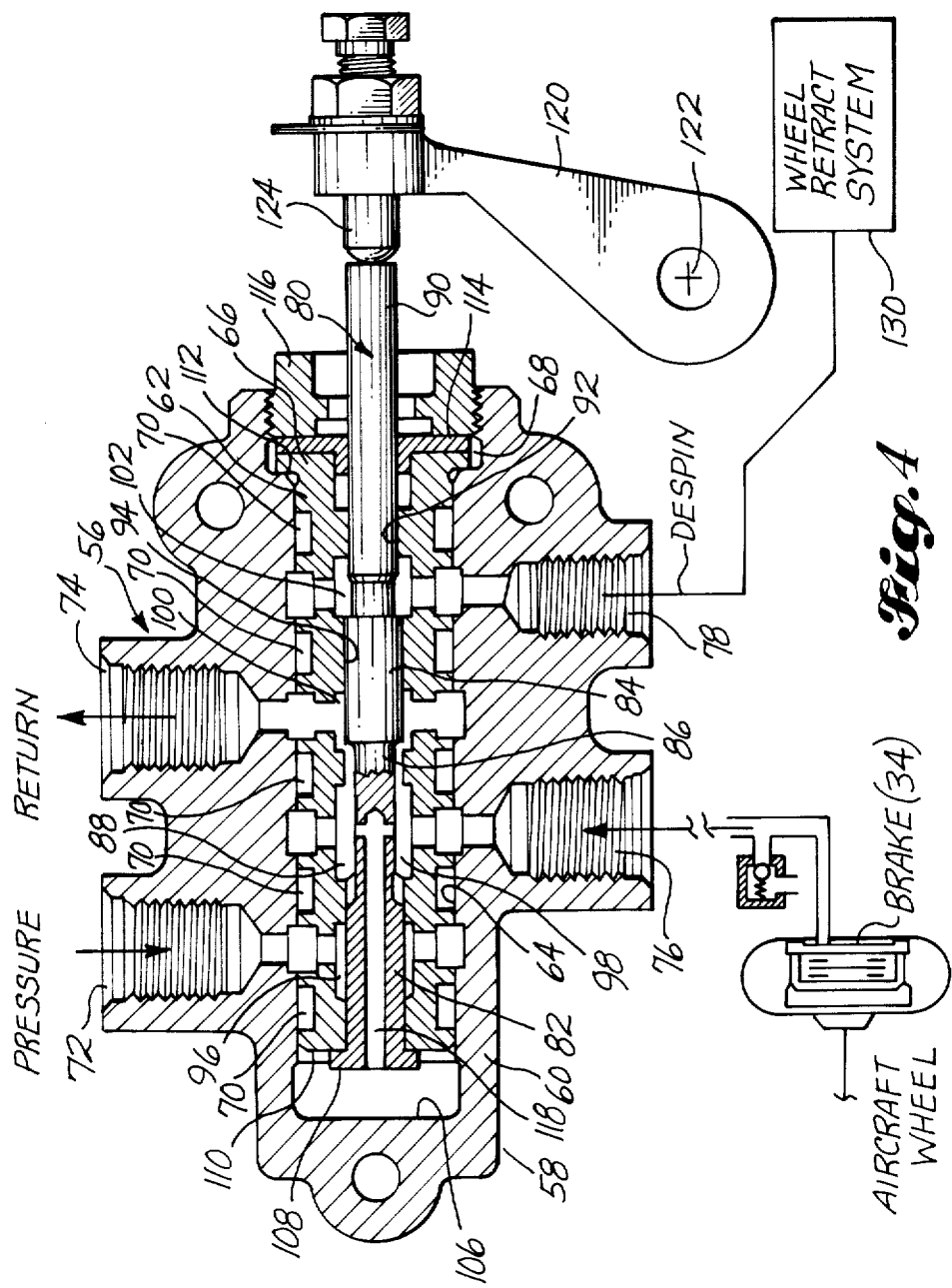

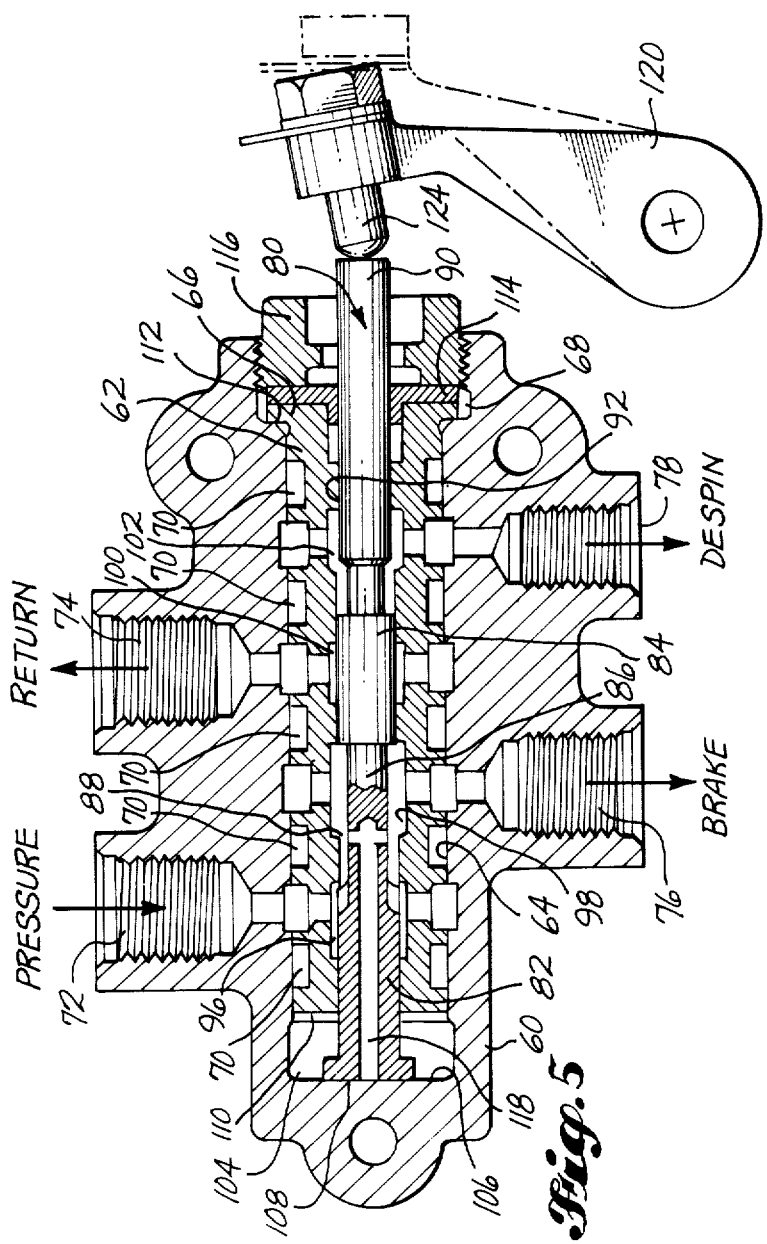

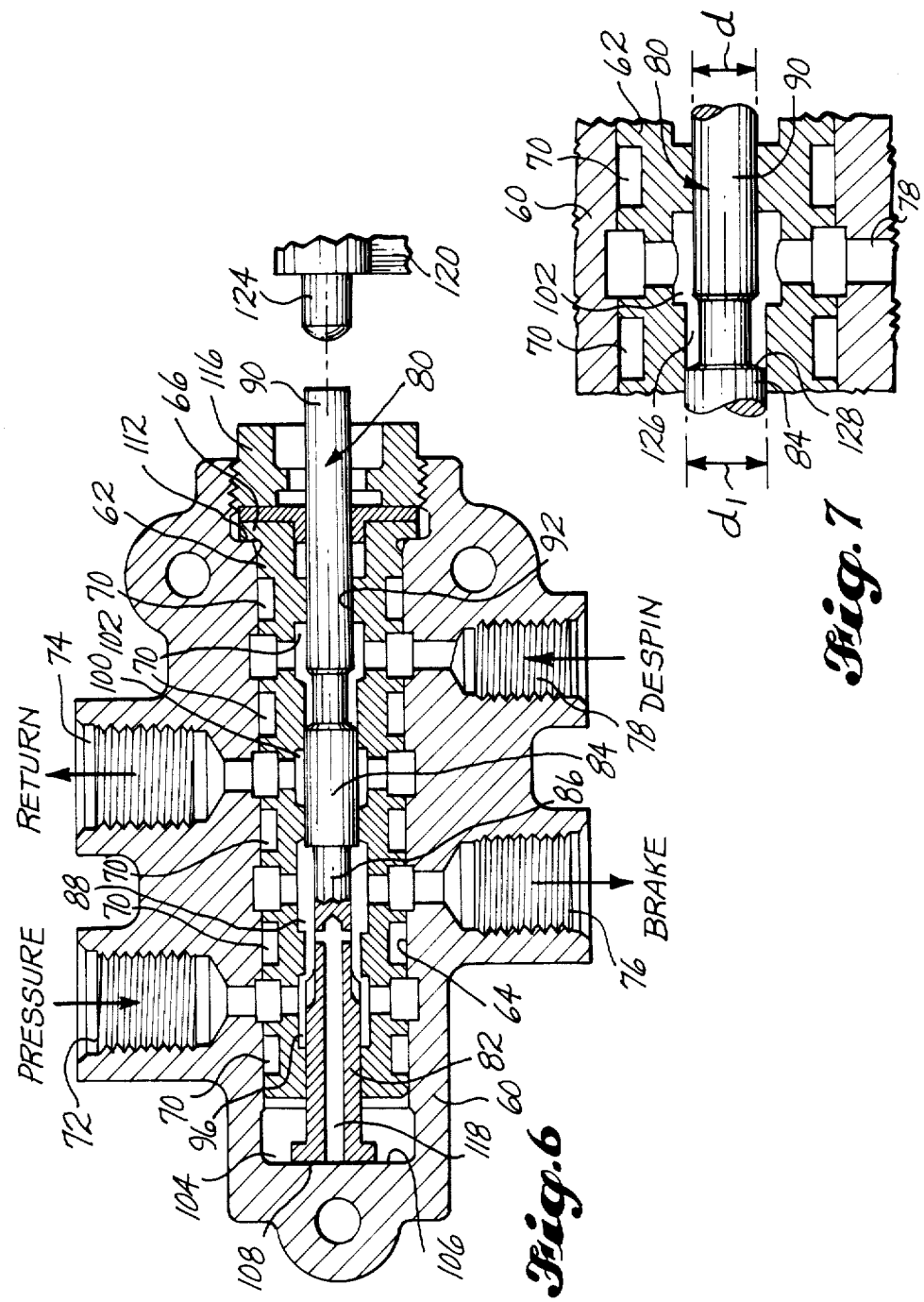

AIRCRAFT WHEEL BRAKE METERING AND DESPIN VALVE

DESCRIPTION

1. Technical Field

The present invention relates to the control of aircraft wheel brakes. More specifically, it relates to the provision of a single valve for performing the dual function of metering flow to the wheel brakes in response to a pilot applied brake pedal force and applying the brakes following take-off to despin the wheels.

2. Background Art

Most modern aircraft, including commercial jet transports manufactured by the Boeing Company of Seattle, Wash., use a simple two-position, three-way hydraulic valve to control brake pressure in proportion to the amount of foot pedal load or force applied to the valve by the pilot. In this type of system, the control force applied by the pilot to the brake pedal is transmitted to the valve through a mechanical cable/linkage system. The valve is connected to a hydraulic pressure source so that it can meter flow to the brakes in a controlled fashion in proportion to displacement of the valve. This type of valve typically contains a feedback chamber which is supplied with the metered pressure output of the valve, i.e. the pressure delivered to the brakes. By this means, the pilot applied force which displaces the port control member of the valve becomes balanced in a closed loop fashion by the metered pressure which is developed as a result of flow through the valve to the brakes. As the feedback pressure (which may also be termed the "brake metered pressure") increases, the valve is driven back to a no flow or null position, against the pilot applied force, to achieve a condition of equilibrium. To release the brakes, the pilot simply relaxes the applied force. The brake pressure feedback force then moves the port control member of the valve back to its off position in which it communicates the brake line with return pressure.

The takeoff procedure causes the aircraft wheels to spin. It is desired to stop this spinning before retracting the wheels up into the wheel well. In some conventional systems, a hydraulic actuator has been attached to the metering valve housing to apply the brakes for despinning the wheels. A problem of this type system is that the separate actuator takes space which is not always available.

A principal object of the present invention is to provide a combined metering and despin valve within a single housing, to solve the space limitation problem.

DISCLOSURE OF THE INVENTION

The metering and despin valve of the present invention includes components for performing the functions of a conventional brake metering valve, including a port control member having an off position in which it blocks a supply pressure port and connects a brake port to a return pressure port. The port control member is movable by a pilot applied pedal force, to meter pressure and flow through the valve from a supply pressure to the brake line in an amount proportional to displacement of the port control member.

In accordance with the present invention, the housing of the valve is constructed to define a command pressure chamber which is connected to a despin port. The port control member is constructed to present a pressure surface portion to the command pressure chamber which is directed to produce a force acting on the port control member, for urging it towards a brake applying position when pressure is within the command pressure chamber.

According to an aspect of the invention, the despin port can be connected to a portion of the wheel retract system, so that when pressure is delivered to the wheel retract system, for retracting the wheels, some of this pressure will be introduced into the despin port.

In accordance with another aspect of the invention, the command pressure chamber is an annular chamber which surrounds the port control member. The port control member has a first diameter at the end of the command pressure chamber closest to the closed end of the valve housing and a smaller second diameter at the end of the command pressure chamber closest to an open end of the valve housing. This provides an area differential on the port control member which is exposed to the command pressure chamber. The difference in area is the aforementioned pressure surface portion which produces the force urging the port control member towards a brake applying position when pressure is within the command pressure chamber.

After the brakes have been applied, stopping the spin of the wheels, the feedback of the brake pressure to the feedback chamber functions to move the brakes to an off position.

BRIEF DESCRIPTION OF THE DRAWINGS

Like reference numerals are used to designate like parts throughout the several views of the drawing, and:

FIG. 4 is a schematic view of the system of the present invention, showing the metering and despin valve of the present invention in an off position;

FIG. 5 is a view of the valve portion of FIG. 4, showing the foot pedal controlled mechanical linkage moved for applying the brakes;

FIG. 6 is a view like FIG. 5, showing the linkage at rest and fluid pressure being introduced through the despin port for applying the brakes; and FIG. 7 is an enlarged scale view of the command pressure chamber and the differential area portion of the port control member which, in conjunction with the command pressure chamber, defines an internal despin actuator.

BEST MODE FOR CARRYING OUT THE INVENTION

Figure 1:
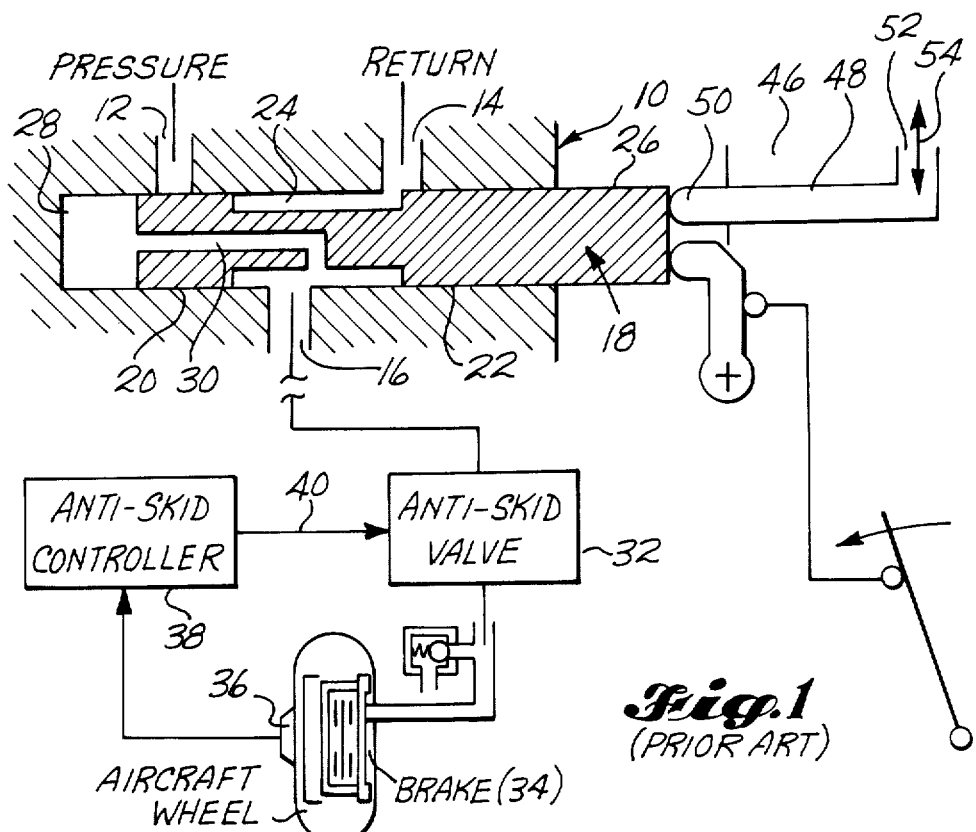
FIG. 1 is a schematic view of a conventional brake control system for an aircraft wheel brake, using a pilot controlled slide valve for metering both flow and pressure to the brake pistons of an aircraft wheel, and also showing an auxiliary fluid motor added to the system for applying a force on the port control member of the valve for applying the brakes to stop the wheels from spinning as a part of the process of retracting the wheels.
Figure 2:
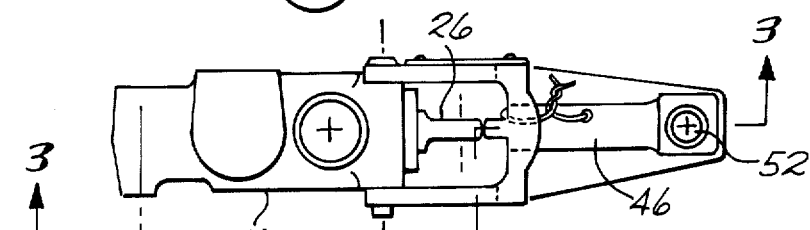
FIG. 2 is a side elevational view of an actual conventional metering valve showing a conventional way of mounting an auxiliary actuator onto the valve housing, for operating the brakes to stop the wheels from spinning.
Figure 2:
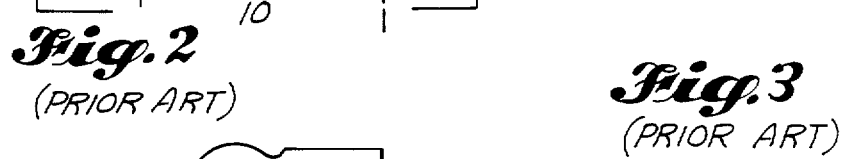
Figure 3:
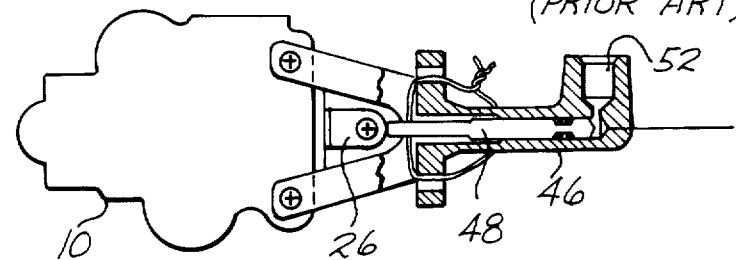
FIG. 3 is a bottom plan view of the assembly shown by FIG. 2.

Referring to FIGS. 1–3, the conventional brake control system comprises a metering valve 10 having a pressure port 12, a return port 14 and an output or brake port 16. Valve 10 also includes a port control member 18 having first and second spaced apart lands 20, 22 separated by an annular galley 24. Port control member 18 includes a control portion 26 which projects out from an end opening in the valve housing. The opposite end of the housing is closed and a feedback chamber 28 is defined between the closed end and the inner end of the port control member 18. A feedback passageway extends between the feedback chamber 28 and the annular galley 24.

FIG. 1 shows the valve 10 in its off position. The port control member 18 is extended, the land 20 blocks the pressure port 12, and the brake port 16 is connected to return pressure via galley 24 and return port 14.

In a typical system, an anti-skid valve 32 is positioned between the metering valve 10 and the brake 34. A transducer 36 measures the wheel speed and sends a signal to a controller 38. If the signal indicates a wheel skidding condition, a signal 40 is sent to the anti-skid valve 32, causing it to adjust the brake pressure towards removing the anti-skid condition.

Typically, a system of cables and mechanical linkages, designated 42 in FIG. 1, connect a foot pedal 44 with the control and portion 26 of the metering valve 10. A pilot applied force on the foot pedal 44 is transmitted by the cables, linkages, etc. to the port control member 18. The member 18 is displaced inwardly proportional to the pedal movement. As member 18 moves inwardly, it first closes the return port 18 and then opens the pressure port progressively in proportion to its displacement. The initial flow of fluid from the supply pressure fills the conduits and brake components downstream of brake port 16 and applies the brakes. Then there is a pressure build-up in the brake line which is transmitted by the feedback passage 30 to the feedback chamber 28. The feedback pressure then acts to move the port control member 18 in opposition to the pilot applied force, moving it into a no flow or null position.

The take-off operation imparts a spin to the aircraft wheels. It is desirable to stop the wheels from spinning before retracting the wheels into the wheel well of the aircraft. It is known to position an actuator 46 at the outer end of the port control member 18, to serve as a way of hydraulically depressing the port control member 18 following take-off, for removing the spin from the wheels. The actuator 46 is shown schematically in FIG. 1. It includes a piston 48 having an outer end portion 50 positioned to exert a force on the control end portion 26 of the port control member 18. The opposite or inner end of the piston 48 is subjected to a fluid chamber 52. A conduit 54 delivers fluid into and outfrom the chamber 52. The actuator 46 is put into operation immediately following take-off, and before the wheels are retracted. Hydraulic cylinders are used for retracting the wheels. Some of the pressure supplied to these cylinders may be directed to the actuator 46 so that a command to the actuators for retracting the wheels will automatically send pressure to actuator 46 for braking the wheels to stop their spinning.

As shown in FIGS. 2 and 3, it has been the practice to mount the despin actuator 46 onto the housing of the metering valve 10. Actuator 46 is positioned endwise outwardly of the control end portion 26 of the port control member 18. A problem of this type of arrangement is that the actuator 46 takes up a substantial amount of space and in some aircraft this space is not available.

An embodiment of the present invention is shown by FIGS. 4–7. It includes a combined metering and despin valve 56. Valve 56 may be constructed to comprise a housing 58 having an outer part 60 and an inner sleeve part 62. The outer housing part 60 is formed to include an axial chamber 64 into which the sleeve 62 is received. Sleeve 62 includes a head portion 66 at its outer and which fits down into a well 68 provided at the open end of the housing outer part 60. In known fashion, a plurality of seals 70 surround sleeve 62 and seal between sleeve 62 and housing part 60.

Housing part 60 is formed to include a pressure port 72, a return port 74, a brake port 76 and a despin port 78. The outer portions of these ports 72, 74, 76, 78 are adapted to receive connector fittings at the ends of conduits for the hydraulic fluid.

Sleeve 62 includes a central axial passageway in which the port control member 80 is received. Port control member 80 comprises a pair of axially spaced apart lands 82, 84 of the same diameter, interconnected by a reduced diameter portion 86 for the purpose of defining an annular galley 88 between the two lands 82, 84. The outer end portion 90 of port control member 80 is smaller in diameter than the lands 82, 84. As a result, the portion 92 of the axial chamber in sleeve 62 which is situated on the outboard side of the change in diameter, is smaller in diameter than the portion 94 situated on the inboard side of the region of diameter change.

The inner end of pressure port 72 is connected to an annular chamber 96 which surrounds an inner end portion of the port control member 80. The inner end of brake chamber 76 communicates with an annular chamber 98 surrounding the reduced diameter portion 86 of port control member 80. The inner end of return port 74 communicates with an annular chamber 100 in the region of land 84 and part 86 of port control member 80. The inner end of despin chamber 78 communicates with an annular chamber 102 which surrounds the region whereat the change in diameter of port control member 80 occurs.

A feedback chamber 104 is formed between an end wall 106 of housing part 60 and the inboard end 108 of port control member 80. The end portion 108 of port control member 80 includes a flange which is in contact with end 110 of sleeve 62 when the port control member 80 is fully extended.

The assembly of valve 56 involves the port control member 80 being inserted into the sleeve 62 from the inner end of the sleeve 62. Then, the sleeve and port control member 62, 80 are together inserted into the chamber 64, from the open end of housing part 60 and is moved inwardly until the head portion 66 of sleeve 62 makes contact with shoulder 112. Then an end seal 114 is installed and then a nut 116 is screwed into the open end of housing part 60 and tightened down onto the end seal 114.

Port control member 80 is formed to include a feedback passageway 118 which communicates feedback chamber 104 with annular chamber 98 and the galley region 88.

By way of typical and therefore nonlimitive example, the mechanical system for actuating the port control member 80 may comprise a crank arm 120 mounted for rotation about an axis 122. Arm 120 includes a pusher 124 positioned to make contact with the outer end of port control member 80.

FIG. 4 shows the system in a brake off position. Land 82 blocks pressure port 72. Brake port 76 is communicated with return port 74 via galley 88 and chambers 98, 100. The chamber 102, which may be termed a command pressure chamber, is closed inwardly by the land 84 and outwardly by the reduced diameter portion 90. The despin port 78 is connected to return pressure.

When the pilot steps on the pedal 44 to activate the brakes, the system of cable and linkage 42 causes the arm 120 to swing towards port control member 80. As it moves the pusher 124 displaces port control member 80 inwardly. Land 84 is moved into a position in which it closes return port 74. Galley 88 is moved into communication with pressure port 72. Pressure port 72 is progressively uncovered and low flow on pressure are metered from the supply pressure to the brake lines via port 72, chamber 76, galley 88, chamber 98, port 76, in proportion to displacement of port control member 80.

Referring to FIG. 7, a galley 126 may be provided between land 84 and the reduced diameter portion 90 of port control member 80, so that pressure surface 128 on member 80 will always be subjected to pressure within command pressure chamber 102.

The effective part of the pressure surface 128 is the portion of the surface which is situated radially outwardly of the control member portion 90. Pressure acting on this area is not balanced in the opposite direction and for that reason it produces an axial force on port control member 80, in the inward or brake applying direction.

In accordance with the present invention, when it is desired to despin the aircraft wheels, the despin port 78 is connected to a supply pressure. This pressure acting on the differential area portion of pressure surface 128 moves the port control member 80 inwardly to apply the brakes, for removing spin from the wheels. The brakes will be applied and then the pressure build-up in the brake line will be transmitted to the feedback chamber 102, for moving the port control member 80 to an off position, i.e. the condition shown by FIG. 4.

In accordance with an aspect of the invention, the despin brake control is applied automatically in response to a command signal to the wheel retract cylinders. This is simply done by porting some of the pressure that is delivered to the retract cylinders to the despin port 78. Following retraction, the despin port 78 is connected to return pressure.

The valving details can be done in a number of ways and the specifics of these details are not a part of this invention. Therefore, the wheel retract system 130 is merely shown in block diagram form in FIG. 4. The important part is that such system include means for connecting supply pressure to despin port 78 at the start of the wheel retract operation, followed by a connection of the despin port 78 to return pressure.

It is to be understood that the system that has been illustrated and described is merely one embodiment of the invention. The details of construction of the metering and despin valve, and the other components of the system, can be changed without departing from the invention as defined by the claims. It is the claims, interpreted in accordance with the established rules of patent claim interpretation, including the doctrine of equivalents, that is to determine the scope and content of the invention.

What is claimed is:

1. A metering and despin valve for use in an aircraft to control pressure and flow to and from a wheel brake on a retractable landing gear, said valve comprising:

a housing including wall means defining an elongated first chamber having an open end and a closed end, said housing further including a supply pressure port, a return pressure port, a brake port and a despin port;

an elongated sleeve within said first chamber, said sleeve including an inner end, an outer end, and an elongated second chamber having an open inner end and an open outer end, said sleeve being inserted into the housing through the open end of the first chamber;

retainer means at the open end of the first chamber for securing the sleeve within the housing;

an elongated port control member within said second chamber, including a control end portion which projects from the second chamber, through and then outwardly beyond said retainer means;

said port control member comprising a pair of axially spaced apart lands and an annular galley between the lands;

said sleeve including first passageway means communicating the second chamber with the supply pressure port, second passageway means communicating the second chamber with the brake port, third passageway means communicating the second chamber with the return port and fourth passageway means communicating the second chamber with the despin port;

said port control member having a retracted position in which said annular galley communicates the first passageway means, and hence the supply pressure port, with the second passageway means, and hence the brake port, and the second land means closes the third passageway means;

said port control member having an extended position in which the first land closes the first passageway means and the annular galley connects the second passageway means, and hence the brake port, with the third passageway means, and hence the return port;

said port control member functioning to meter brake pressure from the supply pressure port to the brake port in response to the port control member being moved from its extended position to its retracted position;

said port control member comprising an annular command pressure chamber located between the second land and the control end portion;

said control end portion being smaller in diameter than and first and second lands;

said command pressure chamber being always in communication with the fourth passageway means;

said command pressure chamber having a radial surface at the end thereof adjacent said second land, functioning as a pressure surface directed to produce a force acting on the port control member, in response to hydraulic pressure in the command pressure chamber, for urging the port control member toward a brake applying retracted position; and said port control member being inserted into the second chamber from the inner end of said second chamber, prior to the sleeve being inserted into the first chamber.

2. A metering and despin valve according to claim 1, wherein the inner end of the sleeve is spaced from the closed end of the first chamber, to define a feedback chamber, and wherein said valve port control member includes a feedback passageway which connects the feedback chamber with the annular galley region of the port control member.

3. A metering and despin valve according to claim 2, comprising stop means at the inner end of the port control member which contacts the inner end of the sleeve, to establish the fully extended position of the port control member.

4. A metering and despin valve according to claim 1, wherein a housing includes a well at the open end of the first chamber which is larger in diameter than the first chamber, and a shoulder formed where the first chamber and the well meet, and wherein the sleeve includes stop means at its outer end which contacts the shoulder.

5. A metering and despin valve according to claim 4, wherein the well is internally threaded outwardly of said stop means and the retainer means comprises a member with external threads which is threadable into the well, into snug contact with the stop means on the sleeve, said member including a central opening through which the control end portion of the port control member extends.

6. A metering and despin valve according to claim 5, wherein the inner end of the sleeve is spaced from the closed end of the first chamber, to define a feedback chamber, and wherein said valve port control member includes a feedback passageway which connects the feedback chamber with the annular galley region of the port control member.

7. A metering and despin valve according to claim 6, comprising stop means at the inner end of the port control member which contacts the inner end of the sleeve, to establish the fully extended position of the port control member.

8. A despin system, comprising:
a retractable landing gear including wheel means, brake means for said wheel means, and a wheel retract system,
a metering and despin valve, comprising:
a housing including wall means defining an elongated first chamber having an open end and a closed end, said housing further including a supply pressure port, a return pressure port, a brake port and a despin port;
an elongated sleeve within said first chamber, said sleeve including an inner end, an outer end, and an elongated second chamber having an open inner end and an open outer end, said sleeve being inserted into the housing through the open end of the first chamber;
retainer means at the open end of the first chamber for securing the sleeve within the housing;
an elongated port control member within said second chamber, including a control end portion which projects from the second chamber, through and then outwardly beyond said retainer means;
said port control member comprising a pair of axially spaced apart lands and an annular galley between the lands;
said sleeve including first passageway means communicating the second chamber with the supply pressure port, second passageway means communicating the second chamber with the brake port, third passageway means communicating the second chamber with the return port and fourth passageway means communicating the second chamber with the despin port;

said port control member having a retracted position in which said annular galley communicates the first passageway means, and hence the supply pressure port, with the second passageway means, and hence the brake port, and the second land means closes the third passageway means;
said port control member having an extended position in which the first land closes the first passageway means and the annular galley connects the second passageway means, and hence the brake port, with the third passageway means, and hence the return port;
said pressure port being connected to system pressure, said return port being connected to return pressure, said brake port being connected to the wheel brake means, and said despin port being connected to the wheel retract system;
pilot control means for pushing on the control end portion of the port control member, to move it from its extended position to its retracted position, said port control member functioning to meter brake pressure from the supply pressure port to the brake port in response to the port control member being moved from its extended position to its retracted position;
said port control member comprising an annular command pressure chamber located between the second land and the control end portion;
said control end portion being smaller in diameter than the first and second lands;
said command pressure chamber being always in communication with the fourth passageway means;
said command pressure chamber having a radial surface at the end thereof adjacent said second land, functioning as a pressure surface directed to produce a force acting on a port control member, in response to hydraulic pressure in the command pressure chamber, for urging the port control member toward a brake applying retracted position;
said wheel retract system providing system pressure to the despin port while the wheels are being retracted, and connecting the despin port to return pressure following retraction; and
said port control member being inserted into the second chamber from the inner end of said second chamber, prior to the sleeve being inserted into the first chamber.

9. A despin system according to claim 8, wherein the inner end of the sleeve is spaced from the closed end of the first chamber, to define a feedback chamber, and wherein said valve port control member includes a feedback passageway which connects the feedback chamber with the annular galley region of the port control member.

10. A despin system according to claim 9, comprising stop means at the inner end of the port control member which contacts the inner end of the sleeve, to establish the fully extended position of the port control member.

11. A despin system according to claim 8, wherein a housing includes a well at the open end of the first chamber which is larger in diameter than the first chamber, and a shoulder formed where the first chamber and the well meet, and wherein the sleeve includes stop means at its outer end which contacts the shoulder.

12. A despin system according to claim 11, wherein the well is internally threaded outwardly of said stop means and the retainer means comprises a member with external threads which is threadable into the well, into snug contact with the stop means on the sleeve, said member including a central opening through which the control end portion of the port control member extends.

13. A despin system according to claim 12, wherein the inner end of the sleeve is spaced from the closed end of the first chamber, to define a feedback chamber, and wherein said valve port control member includes a feedback passageway which connects the feedback chamber with the annular galley region of the port control member.

14. A despin system according to claim 13, comprising stop means at the inner end of the port control member which contacts the inner end of the sleeve, to establish the fully extended position of the port control member.

* * * * *

UNITED STATES PATENT AND TRADEMARK OFFICE
CERTIFICATE OF CORRECTION

PATENT NO. : 4,714,298
DATED : December 22, 1987
INVENTOR(S) : Jacob A. Mail

It is certified that error appears in the above-identified patent and that said Letters Patent are hereby corrected as shown below:

Column 3, line 24, "control and" should be -- control end --.

Column 4, line 7, "outer and" should be -- outer end --.

Claim 1, column 6, line 50, "and", first occurrence, should be -- the --.

Signed and Sealed this

Twenty-eighth Day of June, 1988

Attest:

DONALD J. QUIGG

Attesting Officer   Commissioner of Patents and Trademarks